US006208926B1

(12) United States Patent
Wagner et al.

(10) Patent No.: US 6,208,926 B1
(45) Date of Patent: Mar. 27, 2001

(54) METHOD AND APPARATUS FOR CONTROLLING THE BRAKE SYSTEM OF A VEHICLE

(75) Inventors: Jochen Wagner; Helmut Wiss, both of Moeglingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 08/843,524

(22) Filed: Apr. 18, 1997

(30) Foreign Application Priority Data

Apr. 26, 1996 (DE) ............................................. 196 16 732

(51) Int. Cl.[7] ............................... G06F 7/70; G06F 19/00
(52) U.S. Cl. .............................. 701/70; 701/71; 701/82; 303/3; 303/169; 303/68; 303/93
(58) Field of Search ................... 303/3, 169, 100, 303/110, 155, 68–69, 93, 194; 364/426, 426.01; 13/68; 701/70, 71, 82, 83

(56) References Cited

U.S. PATENT DOCUMENTS

| 3,752,268 | * | 8/1973 | Gfeller ................................. 188/181 |
| 4,140,352 | * | 2/1979 | Delpech et al. ........................ 303/93 |
| 4,662,687 | * | 5/1987 | Leiber .................................. 303/110 |
| 4,712,839 | * | 12/1987 | Brearley et al. ......................... 303/3 |
| 4,747,051 | * | 5/1988 | Hall et al. ............................. 364/426 |
| 5,213,077 | * | 5/1993 | Nishizawa et al. .................... 123/352 |
| 5,423,601 | * | 6/1995 | Sigl ..................................... 303/100 |
| 5,443,307 | * | 8/1995 | Maier .................................. 303/169 |
| 5,454,629 | * | 10/1995 | Johnson .............................. 303/156 |
| 5,549,089 | * | 8/1996 | Snell et al. ........................... 123/352 |
| 5,646,848 | * | 7/1997 | Walenty et al. ................. 364/426.01 |
| 5,762,407 | * | 6/1998 | Stacey et al. ........................ 303/155 |
| 5,782,541 | * | 7/1998 | Schappler ................................ 303/3 |
| 5,816,670 | * | 10/1998 | Yamada et al. ....................... 303/194 |
| 5,853,230 | * | 12/1998 | Wagner et al. .................... 303/113.4 |
| 5,865,512 | * | 2/1999 | Meiser et al. ........................ 303/139 |

FOREIGN PATENT DOCUMENTS

| 0173954 | 3/1986 | (EP) . |
| 0204483A2 | * 5/1986 | (EP) ........................................ 16/18 |
| 0204483 | 12/1986 | (EP) . |
| 2303417 | 2/1997 | (GB) . |

OTHER PUBLICATIONS

Derwant Abstract of DE 43 38 399 A (1994).

* cited by examiner

Primary Examiner—William A. Cuchlinski, Jr.
Assistant Examiner—Olga Hernandez
(74) Attorney, Agent, or Firm—Fulbright & Jaworski, LLP

(57) ABSTRACT

A deceleration regulator which generates a nominal deceleration value, preferably a PID controller, can be adapted to the requirements of the brake engagement. A guidance magnitude filter is used, a preliminary control dependent on the nominal deceleration is performed, and the integral component of the regulator is activated only in certain states of operation. In certain courses of the nominal value, a portion of the regulator is corrected.

14 Claims, 2 Drawing Sheets

METHOD AND APPARATUS FOR CONTROLLING THE BRAKE SYSTEM OF A VEHICLE

BACKGROUND OF THE INVENTION

The invention relates to a method and an apparatus for controlling the brake system of a vehicle.

DE 195 26 659, to which U.S. application Ser. No. 08/663,677 corresponds, discloses a method and an apparatus for controlling the brake system of a vehicle, in which the braking force at the wheels is actively controlled during a braking event according to the way the brake pedal is actuated by the driver. A deceleration regulator is provided for control, and a nominal deceleration value for the vehicle is derived from the way in which the driver operates the brake pedal. This nominal deceleration value is converted by the regulator to a factor representing the braking moment to be applied to the wheel brakes. This factor is in turn adjusted preferably in a braking moment regulator by controlling the brake force at the wheel brakes (e.g., by controlling the brake pressure). In the preferred embodiment a PID (proportional-integral-differential) regulator is used as the this regulator.

The brake system itself has a great influence on the performance of the regulator since the way in which it increases and reduces the brake moment can be very different. In one preferred embodiment a hydraulic brake system is used in which the dynamic differences have an important influence on the controlling action.

DE 43 38 399 A1 discloses a driving speed regulator which on the basis of the difference between a nominal or target speed and the actual speed forms a target deceleration value which is the basis for intervention into the brake system of the vehicle toward sustaining the target speed.

For the brake control, it is desirable to have a driving speed regulator of this kind act on the same deceleration regulator. Due to the abrupt changes in the nominal value generated by the deceleration regulator, which in such a case occur in switching between the various value setting means, the controlling action of the deceleration regulator, and thus the action of the brake control itself, might be perceptibly impaired.

It is the object of the invention to offer a deceleration regulator for controlling the brake system of a vehicle, which is adapted to the requirements of automatic braking of the vehicle in various situations.

SUMMARY OF THE INVENTION

A deceleration regulator for controlling the brake system is offered, which adapts itself to different requirements of automatic deceleration.

It is especially advantageous that the dynamics of the engagement of the brakes are considerably improved by a preliminary control of the intervention factors given by the deceleration regulator. It is furthermore especially advantageous that, by controlling the integral component of the deceleration regulator, a decided improvement of control performance is achieved with regard to the dynamics of brake application. This improvement is seen especially in hydraulic brake systems. This eliminates any special adaptation of the regulator to the various time factors in brake systems.

Advantageously, furthermore, a structural changeover or command variable filter is used whereby, in the event of a change of the setting means (e.g., from the driving speed regulator to the brake pedal) the performance of the regulator is considerably improved. Any possible abrupt changes of nominal values result in no adverse effect on the regulator and its performance, so that in this operational situation the application of the brakes has no adverse effect on comfort.

DESCRIPTION OF EMBODIMENTS

Figure 1:
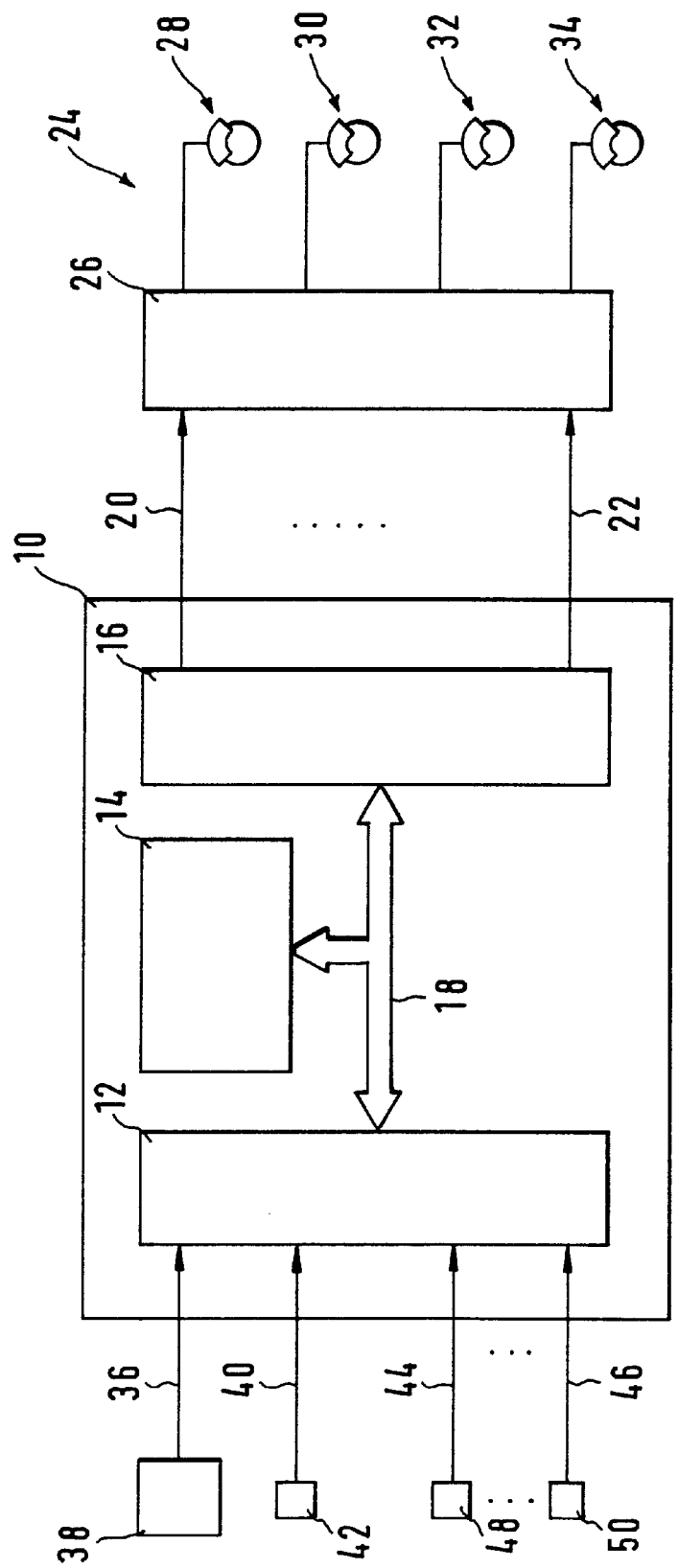
FIG. 1 shows a general block diagram of a system for controlling a brake system of a vehicle, while in FIG. 2 a preferred embodiment of the deceleration regulator is shown in a block diagram.

FIG. 1 shows an electronic control unit 10 which has access through an input circuit 12 to at least one output circuit 16. These are connected together through a communication system 18 for the exchange of data and information. The electronic control unit controls the brake system 24 of a vehicle through output lines 20–22. In the preferred embodiment it is a hydraulic brake system which has pump and valve arrangements 6 which control the braking force at the individual wheel brakes 28, 30, 32 and 34 according to the signals delivered through the lines 20–22. Such brake systems are state of the art. Furthermore, input lines are connected to the electronic control unit 10, and they are combined in a bus system (e.g., CAN) in the preferred embodiment. A first input line 36 leads from a driving speed regulator 38 to the control unit 10, while an additional input line 40 runs from a brake pedal 42 to the control unit 10. A factor representing the nominal deceleration, or a factor from which a nominal deceleration is derivable, is put out by the driving speed control system, while a factor representing the degree of braking (stroke length, force, pressure, etc.) is put out from the brake pedal 42 through the input line 40. Also, input lines 44–46 are provided, which run from measuring devices 48–50 and feed additional data on the brake system of the vehicle or its motor, such as wheel speed, motor speed, applied braking force (brake pressure) etc.

The control functions to be executed to control the brake system are implemented as programs in the microcomputer 14. In addition to the known functions, the ABS, ASR etc., the control unit 10, in a preferred embodiment, controls the brake force at the wheel brakes independently of the driver's wish in situations in which the driver very rapidly depresses the brake pedal due to a dangerous situation. In this kind of braking situation, a nominal vehicle deceleration factor is derived by means of computations, characteristics and performance graphs from the way the brake pedal is operated. As in the state of the art referred to above, this nominal factor is compared with the actual deceleration data and fed to a regulator which on the basis of the predetermined regulating strategy produces an output signal which represents a braking moment which is to be applied to the wheel brakes and is such that the actual deceleration approaches the nominal deceleration. In the preferred embodiment, the brake moment factor determined by the regulator is set for each wheel brake by operating the valve and pump system 26. In addition to this so-called brake assist function, which acts only in panic braking situations, provision can additionally be made for performing the deceleration action according to the way the brake pedal is operated by regulating the wheel brakes and thus nominal the brake force amplification electronically. Furthermore, provision can be made for a vehicle speed regulator, especially one which cooperates with a radar detector, to act on the brakes to reduce the speed and maintain the nominal speed or preserve a minimum distance from another vehicle. For that purpose the speed regulator 38 sends to the control unit 10 a nominal deceleration signal, or it sends factors from which such a signal can be derived, which is then executed by acting on the wheel brakes. The vehicle speed regulator 38 can also be a component of the control unit 10 and can be implemented as programs in the microcomputer 14.

In the preferred embodiment, a hydraulically operated brake system is used as the brake system. The invention, however, is not limited to this application, but is used with the described advantages also in air brake systems or electric motor-operated wheel brakes.

Figure 2:
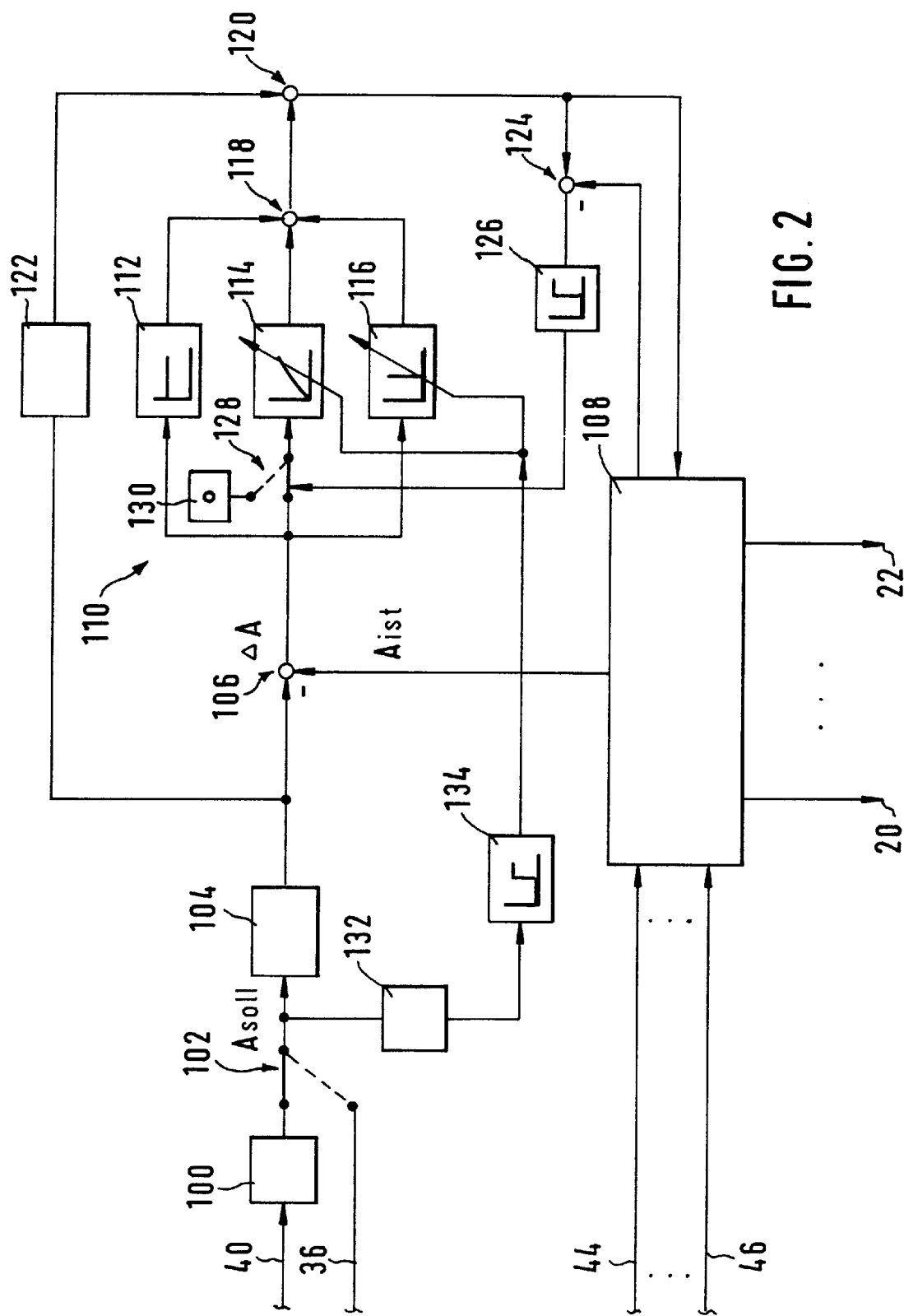

A preferred embodiment of the described control is represented in a block diagram in FIG. 2. This block diagram represents a program of the microcomputer in which the individual elements represented in FIG. 2 are parts or steps of the program.

The way in which the brake pedal is operated, which is communicated through line 40, is converted, by means of a characteristic curve 100, for example, to a nominal deceleration factor $A_{SOLL}$. In the preferred embodiment of a so-called brake assist, the characteristic 100 is a performance graph in which the degree of actuation, present in the form of the pressure $P_{VOR}$ in the master brake cylinder of the brake system, taking its rate of variation $dP_{VOR}dt$ into account, is converted to a nominal deceleration factor. This nominal factor is fed through a switch 102 to a reference magnitude filter. Accordingly, the nominal deceleration factor fed by the vehicle speed regulator through line 36, when the switch 102 is in the appropriate position, is fed to the filter 104. The switch 102 changes between its positions according to the operational situation. If it is active, the switch 102 is in the position indicated by the broken line; if the vehicle speed regulator is not active it is in the position indicated by a solid line. The reference magnitude filter 104 serves to adapt the nominal value to the physically possible range of values and is one of the measures which is introduced to improve the control performance when the nominal values change abruptly. The filtering action of the reference magnitude filter is such that the next-following deceleration regulator follows an abrupt change of the nominal deceleration in a smooth manner. An example of this filtration is a slope limitation of the nominal value by which the abrupt changes in the nominal value are avoided.

The nominal acceleration factor filtered in this manner is fed to a comparison circuit 106 in which the difference between the nominal deceleration factor $A_{SOLL}$ and the actual deceleration factor AIST is formed. The actual deceleration factor is formed in the brake moment (brake pressure) regulator 108 in relation to the wheel speeds fed through lines 44–46.

The difference between the nominal and actual deceleration ΔA is delivered to a deceleration regulator 110. This regulator consists in the preferred embodiment of a proportional part 112, a variable integral part 114 and a variable or unvariable differential component 116. The signals put out by these parts are connected in an adder 118 to the regulator output signal. The regulator output signal is then fed to an additional adder 120. The output signal of this junction 120 constitutes a nominal brake moment which is fed to the braking moment regulator 108. The latter, by means of the output lines 20–22 influences the valve and pump systems of the brake system to bring the braking moment to the nominal value at the individual wheel brakes. The actual deceleration thus approaches the nominal deceleration.

To improve the action of the regulator, the filtered or unfiltered nominal deceleration factor $A_{SOLL}$ is fed to a computer element 122, where the nominal deceleration is converted directly to a brake moment. This is the result of the product of the mass of the vehicle, the tire radius and the nominal deceleration, and constitutes the brake moment that is to be set in the ideal case (level, unloaded vehicle, etc.) in order to arrive at the nominal deceleration. This brake moment is switched in the junction 120 to the regulator output signal. The regulator accordingly controls only the deviations of the actual marginal conditions from the ideal marginal conditions considered in the preliminary control action.

Furthermore, provision is made for adapting the integral component 114 of the deceleration regulator. The integration of the regulation deviation is performed only when the actual value has nearly reached the nominal value. If the actual value is still decidedly above or below the nominal value, the brake moment portion delivered by the integral component remains constant. To perform this adaptation, the nominal moment value is fed to a comparator 124 to which the actual moment value formed in the brake moment regulator is also fed. The difference between the nominal and the actual value is compared in a threshold value stage 126 with a predetermined threshold. If the difference is below this threshold, that is, if the actual value to be established nearly reaches the nominal value, a switch element 128 is actuated. This switch element in this case connects the regulation deviation to the input of the integral component 114. If the difference between the nominal value and actual value is above the threshold, then the switch element 128 is in the broken-line position. In this position the value 0 is fed from the memory cell 130 to the integral component 114, i.e., the integration is stopped.

In an advantageous embodiment, instead of using the difference between the nominal moment and the actual moment, the difference between the nominal deceleration and the actual deceleration is used to control the integral component in a corresponding manner. If instead of the brake moment regulator another regulator (brake force regulator, brake pressure regulator, current regulator, etc.) is used, the difference to be used as the basis of the control of the integral component can be formed from brake force values, current values or brake pressure values, etc.

By the adaptive control of the integral component a definite improvement of the regulator performance is achieved, especially in regard to its dynamic. Special advantages are shown by this method of procedure in hydraulic systems whose performance in increasing and reducing the moment differs greatly. Thus there is no need for a special adaptation of the regulator to different timing characteristics.

The structural rearrangement of the regulator by changing the nominal value generator was an alternative to the reference magnitude filter 114. The structural rearrangement of the regulator affects the regulator itself such that no abrupt change in the regulator output signal is produced. Especially the integral component and/or the differential component of the regulator is set to specific values by changing over the nominal value generator accordingly, and in a preferred embodiment these values are selected such that, when the nominal value is changed over the regulator output signal remains the same. Thus abrupt changes are effectively prevented, since the regulator smooths them out by its own dynamic.

The structural rearrangement is used not only when switching the nominal value generator but also in all abrupt nominal value changes. For this purpose the course of the nominal value in time is determined from the nominal deceleration value $A_{SOLL}$ in the differentiation stage 132. If the change in the nominal value exceeds the threshold set in the threshold value stage 134, the integral and/or differential components (114, 116) are corrected and set at values which lead to an output signal from the regulator, i.e., to a nominal braking moment which was set before the change in the nominal value.

In the preferred embodiment, a PID regulator is used as the deceleration regulator. In other embodiments one or more parts can be omitted.

Also, in one advantageous embodiment, all of the above-described measures are used, while in other embodiments any desired combination of the measures or only one of the measures is used.

What is claimed is:

1. A method for controlling the brake system of a vehicle, said vehicle comprising a deceleration controller having an integral-action component and at least one other component, said method further comprising:

generating a setpoint deceleration value;

determining an actual deceleration value;

determining the deviation between said actual and said setpoint deceleration value;

producing an output signal by the at least one other component based on the deviation;

determining on the basis of the setpoint deceleration value a control signal in the form of a switching signal that activates the integral action component when the deviation, or a deviation dependent thereon, is less than a first threshold value; taking into account said control signal when the output signal of the controller is formed; and producing an output signal by the integral component based on the deviation when the component is active;

controlling said brake system based on said integral output signal, so that said actual deceleration approaches said setpoint deceleration.

2. The method according to claim 1, wherein a reference variable filter effects an increase delimitation of the setpoint deceleration value.

3. The method according to claim 1, wherein the deceleration controller generates a setpoint value for a braking torque which is to be supplied, which setpoint value is utilized in a braking torque regulation of the braking torque at individual wheel brakes.

4. The method according to claim 1, wherein the contribution of the integral-action component to the control output signal remains constant when the integral-action component is not activated.

5. The method according to claim 1, wherein the control of the brake system occurs in the context of a braking force, brake pressure, current control loop and the controller selects appropriate setpoint values.

6. The method according to claim 1, wherein the setpoint deceleration value is generated by different control or regulating systems depending upon the operating state.

7. The method according to claim 1, wherein the setpoint deceleration value is selected in dependence upon the operating degree of a brake pedal, in dependence upon at least one of the following:

the operating degree of the brake pedal upon panic braking; by a driving speed controller; and in braking cooperation with a radar detector.

8. The method according to claim 1, wherein the deviation on the basis of which the switching signal activates the integral action component is the deviation between a setpoint braking torque value and an actual braking torque value.

9. The method according to claim 1 or 8, further comprising the steps of:

determining on the basis of the setpoint deceleration value at least one of the following additional control signals:

a filtered setpoint deceleration signal;

a pre-control signal of the controller;

a correcting signal that corrects at least one component of the controller when the rate of change of the setpoint deceleration value is greater than a second threshold value, and takes into account said additional control signal(s) when the output signal of the controller is formed.

10. The method according to one claim 9, wherein the precontrol signal, on the basis of the product of tire radius, vehicle mass and setpoint deceleration, forms a control value for the brake system which is applied to the deceleration controller output signal.

11. The method according to claim 10, wherein, when the rate of change of the setpoint value is greater than the second threshold value, the correcting signal sets the integral-action and/or a derivative-action component at values such that the controller output signal remains constant.

12. A device for controlling the brake system of a vehicle, comprising an electronic control unit having:

a means for generating a setpoint deceleration value;

a means for determining an actual deceleration value;

a means for determining the deviation between said actual and said setpoint deceleration value;

a means for producing an output signal by at least one first component based on the deviation;

a means for determining on the basis of the setpoint deceleration value a control signal in the form of a switching signal that activates an integral-action component when the deviation, or a deviation dependent thereon, is less than a first threshold value;

producing an output signal by the integral component based on deviation where the component is active; and a means for controlling said brake system based on said integral output signal, such that said actual deceleration approaches said setpoint deceleration.

13. The device according to claim 12, wherein the deviation on the basis of which the switching signal activates the integral-action component is the deviation between a setpoint braking torque value and an actual braking torque value.

14. The device according to claim 12 or 13, further comprising means for:

determining on the basis of the setpoint deceleration value at least one of the following additional control signals:

a filtered setpoint deceleration signal;

a pre-control signal;

a correcting signal that corrects at least one component of the output signal producing means when the rate of change of the setpoint deceleration value is greater than a second threshold value; and forming the output signal taking into account said additional control signal(s).

* * * * *